No. 622,725. Patented Apr. 11, 1899.
W. E. STAINBACK.
DEVICE FOR MEASURING FIBER LENGTH OF COTTON.
(Application filed Apr. 18, 1898.)
(No Model.)
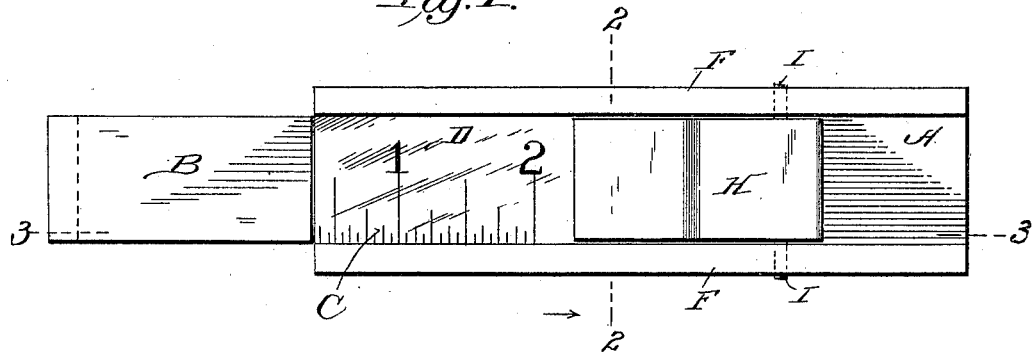
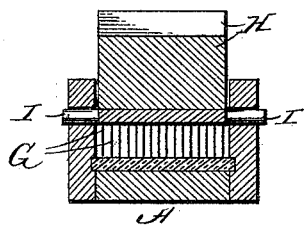
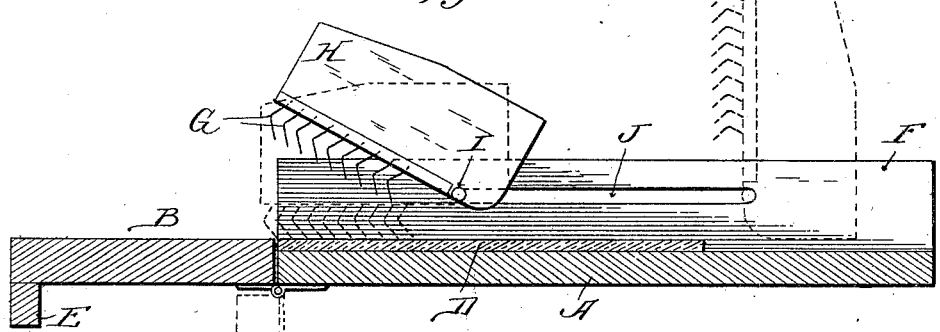
Witnesses:
Harry S. Rohrer
Wm. O. Dyne
Inventor:
William E. Stainback
by Wallace Greene
Atty.

UNITED STATES PATENT OFFICE.

WILLIAM E. STAINBACK, OF MEMPHIS, TENNESSEE.

DEVICE FOR MEASURING FIBER-LENGTH OF COTTON.

SPECIFICATION forming part of Letters Patent No. 622,725, dated April 11, 1899.

Application filed April 18, 1898. Serial No. 678,067. (No model.)

*To all whom it may concern:*

Be it known that I, WILLIAM E. STAINBACK, a citizen of the United States, residing at Memphis, in the county of Shelby and State of Tennessee, have invented certain new and useful Improvements in Devices for Measuring Fiber-Length of Cotton; and I do hereby declare the following to be a full, clear, and exact description of the invention, such as will enable others skilled in the art to which it appertains to make and use the same.

The price of cotton depends largely upon the length of the fiber, and as the producer has usually no ready way of showing error in the estimate of the expert sampler or classifier such error as there may be in the decision of such expert is very rarely or never in the producer's favor.

The object of this invention is to produce a simple device whereby the length of the staple may be easily placed beyond dispute, the producer knowing exactly what he sells and the buyer being equally certain what he purchases. With this object in view each sample of cotton is clamped at one end and then combed out over or alongide of a scale so placed as to show the entire length of the fiber.

In the accompanying drawings, Figure 1 shows the apparatus in plan. Fig. 2 is a cross-section at 2 2, Fig. 1. Fig. 3 is a longitudinal section at 3 3, Fig. 1.

In the figures, A B represent a straight flat bar consisting of two nearly abutting parts hinged together below, so that their meeting ends are, in effect, opposing jaws opened and closed by swinging the two parts with respect to each other on the hinge-axis. From the joint a scale C extends along the part A, and its divisions are arranged as if the zero of the scale were at the lower side of the end face of this part. Over the scale is fixed a smooth transparent plate D. The part B of the bar is equal in thickness to the combined thickness of the part A and the plate D, resting thereon, so that its upper face lies in the plane of the upper face of the plate D. The part B being swung downward with reference to the other part, the butt-end of a sample of cotton may be inserted between the jaws, where it will be firmly clamped when the part B is restored to position. The free portion of the sample may then be bent over upon the plate D, and if it be drawn out straight the scale beneath shows the entire length of the fiber.

On the lower side of the free end of the part B there is a projection E, and if this and the opposite end of the part A rest upon a plane surface the weight of the apparatus tends to close the jaws, and they may be closed yet more forcibly by pressure upon the unsupported middle of the compound bar.

As a convenient means for drawing the sample out straight alongside the scale I fix side pieces F to the lateral edges of the part A and mount upon them a sliding combing device. This latter consists of a comb or card G, fixed to a block H, fitting loosely between the side pieces and supported at some distance above the part A by trunnions I, working in slots J, parallel to the bar. The block may therefore slide back and forth and may rotate on its trunnions between the two positions shown in dotted lines in Fig. 3. The block being pushed away from the jaws already described and a sample of cotton being inserted in the manner set forth, the block may be held in oblique position and carried forward over the sample and then dropped to the position shown in dotted lines near the left in Fig. 3, the teeth resting on the plate D. If now the block be moved back without raising, the sample is combed out straight and smooth under slight tension and the scale lying beneath the plate shows the length of the fiber.

The same sample may be combed out any number of times or different samples may be substituted and measured in rapid succession.

It is obvious that the apparatus may be varied in many ways without passing the proper limits of my invention, and I desire, therefore, to claim the invention both broadly and specifically.

What I claim is—

1. The combination with a bar having upon its face a linear scale, of devices for clamping a sample of cotton in position to extend along said scale, and a comb mounted upon the bar and arranged to be passed along the scale, whereby the fibers may be straightened out and their average length accurately estimated.

2. The combination with a two-part bar having its abutting ends hinged together to swing upon an axis parallel to and at some distance from one face of the bar, and provided with a scale extending along said face from the junction of the two parts, of a fiber-combing device arranged for combing out alongside the scale cotton fibers held between said abutting ends.

3. The combination with the two-part hinged bar provided with a scale extending from the hinge-joint along on part of the bar, of a combing device arranged for sliding along the scale-bearing part of the bar and for swinging toward and away from the same.

4. The combination with a two-part bar having the middle portion of its lower side above the plane of the end portions, and having upon one segment a linear scale with markings located as if the zero-point were upon the end face of the segment, of a hinge connecting the segments of the bar end to end and having its axis below the upper face of the bar, and a comb secured to the scale-bearing segment and arranged to be passed along the segment for straightening out upon it fibers held in the joint between the segments.

5. The combination with the two-part hinged bar unsupported at the middle and having the scale extending from the joint along one part, of the slotted side pieces, the comb-bearing block supported between the side pieces by trunnions working in the slots therein, and the transparent plate covering said scale, substantially as set forth.

In testimony whereof I affix my signature in presence of two witnesses.

WILLIAM E. STAINBACK.

Witnesses:
C. J. WASHINGTON,
JOHN JOHNSTON.